United States Patent
Nakaso et al.

(10) Patent No.: US 9,938,392 B2
(45) Date of Patent: Apr. 10, 2018

(54) RESIN COMPOSITION, RESIN MOLDED ARTICLE, AND METHOD OF PREPARING RESIN COMPOSITION

(71) Applicant: FUJI XEROX CO., LTD., Tokyo (JP)

(72) Inventors: Suguru Nakaso, Kanagawa (JP); Wataru Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/210,206

(22) Filed: Jul. 14, 2016

(65) Prior Publication Data

US 2017/0240718 A1    Aug. 24, 2017

(30) Foreign Application Priority Data

Feb. 22, 2016  (JP) ................. 2016-031033

(51) Int. Cl.
*C08K 3/30*         (2006.01)
*C08K 3/08*         (2006.01)

(52) U.S. Cl.
CPC .................. *C08K 3/30* (2013.01); *C08K 3/08* (2013.01); *C08K 2003/309* (2013.01)

(58) Field of Classification Search
None
See application file for complete search history.

(56) References Cited

U.S. PATENT DOCUMENTS

| 9,580,580 | B2 * | 2/2017 | Ayabe | .................. C08K 5/1345 |
| 2006/0142559 | A1 * | 6/2006 | Ozaki | ....................... C08B 3/06 536/58 |
| 2008/0246189 | A1 * | 10/2008 | Kuzuhara | ............... B29C 41/28 264/334 |

FOREIGN PATENT DOCUMENTS

| JP | 2006-089574 A | 4/2006 |
| JP | 2009-161701 A | 7/2009 |
| WO | 2004/076490 A1 | 9/2004 |

* cited by examiner

*Primary Examiner* — Melvin C. Mayes
*Assistant Examiner* — Stefanie J Cohen
(74) *Attorney, Agent, or Firm* — Oliff PLC

(57) ABSTRACT

A resin composition includes a cellulose ester resin having a weight average molecular weight of 10,000 to 75,000; sulfuric acid; and at least one metal element selected from the group consisting of Group 1 elements and Group 2 elements, wherein a ratio of the sum of the content [M1] of the Group 1 element and the content [M2] of the Group 2 element to the total amount of all the elements according to fluorescent X-ray spectroscopy is 0.052% by weight, and a molar ratio of the content [M1] of the Group 1 element, the content [M2] of the Group 2 element, and the content [S] of sulfur atoms (S) according to fluorescent X-ray spectroscopy satisfies a relationship of Expression 1:

$([M1]/2)+[M2] \geq 1.5 \times [S]$.

17 Claims, No Drawings

RESIN COMPOSITION, RESIN MOLDED ARTICLE, AND METHOD OF PREPARING RESIN COMPOSITION

CROSS-REFERENCE TO RELATED APPLICATIONS

This application is based on and claims priority under 35 USC 119 from Japanese Patent Application No. 2016-031033 filed Feb. 22, 2016.

BACKGROUND

1. Technical Field

The present invention relates to a resin composition, a resin molded article, and a method of preparing a resin composition.

2. Related Art

In the related art, various resin compositions are provided and are used for various applications. In particular, thermoplastic resins are used in various components and housings of home electronics and automobiles and are used in various components such as housings of business machines and electric and electronic apparatuses.

Recently, plant-derived resins are used, and one of the plant-derived resins known in the related art is a cellulose ester.

SUMMARY

According to an aspect of the invention, there is provided a resin composition including:

a cellulose ester resin having a weight average molecular weight of 10,000 to 75,000;

sulfuric acid; and at least one metal element selected from the group consisting of Group 1 elements and Group 2 elements, wherein a ratio of the sum of the content [M1] of the Group 1 element and the content [M2] of the Group 2 element to the total amount of all the elements according to fluorescent X-ray spectroscopy is 0.052% by weight, and a molar ratio of the content [M1] of the Group 1 element, the content [M2] of the Group 2 element, and the content [S] of sulfur atoms (S) according to fluorescent X-ray spectroscopy satisfies a relationship of Expression 1:

$$([M1]/2)+[M2] \geq 1.5 \times [S].$$

DETAILED DESCRIPTION

Hereinafter, an exemplary embodiment of a resin composition and a resin molded article according to the invention will be described.

Resin Composition

The resin composition according to the exemplary embodiment includes a cellulose ester resin having a weight average molecular weight of 10,000 to 75,000 (hereinafter, referred to as "specific cellulose ester"); sulfuric acid ($H_2SO_4$); and at least one metal element selected from the group consisting of Group 1 elements and Group 2 elements.

A ratio of the sum of the content [M1] of the Group 1 element and the content [M2] of the Group 2 element to the total amount of all the elements according to fluorescent X-ray spectroscopy is 0.052% by weight or lower.

A molar ratio of the content [M1] of the Group 1 element, the content [M2] of the Group 2 element, and the content [S] of sulfur atoms (S) according to fluorescent X-ray spectroscopy satisfies a relationship of the following expression 1.

$$([M1]/2)+[M2] \geq 1.5 \times [S] \quad \text{Expression 1:}$$

The Group 1 element and the Group 2 element refer to a typical element belonging to Group 1 and a typical element belonging to Group 2 in the periodic table, respectively.

Since the resin composition according to the exemplary embodiment has the above-described configuration, the resin composition may provide a resin molded article in which the molecular weight of a cellulose ester resin in the resin molded article is prevented from being reduced to lower than the molecular weight of the cellulose ester resin present in the resin composition.

The reason why this effect is exhibited is not clear but is presumed to be as follows.

In a resin composition including a cellulose ester resin, sulfuric acid used in a step of preparing a cellulose ester resin may remain. Specifically, when cellulose is substituted with an acyl group or the like to perform esterification, in addition to a compound for introducing an acyl group (for example, acetic anhydride in a case where an acetyl group is introduced into cellulose), sulfuric acid is added from the viewpoint of solubility and the like. In addition, in general, cellulose has a high weight average molecular weight of 150,000 or higher. Therefore, in order to obtain a cellulose ester resin having a weight average molecular weight of 10,000 to 75,000 as in the exemplary embodiment, a step of adjusting the molecular weight may be provided during the preparation of the cellulose ester resin, and sulfuric acid may be used in the step of adjusting the molecular weight. Sulfuric acid used in the preparing process remains in a resin composition including the cellulose ester resin.

In a case where a resin molded article is prepared using a resin composition including a cellulose ester resin and sulfuric acid, there are some cases where the molecular weight of the cellulose ester resin in the resin molded article is lower than the molecular weight of the cellulose ester resin that in the resin composition. When the molecular weight decreases, the strength of the obtained resin molded article may decrease.

It is presumed that this decrease in the molecular weight occurs because, when the resin composition is heated to prepare a resin molded article, sulfuric acid in the resin composition is present in the form of sulfate ions ($SO_4^{2-}$) and, due to the effect of the sulfate ions, a main chain of the cellulose ester resin is broken.

A decrease in the molecular weight tends to become severe in a case where the resin molded article is an injection-molded article obtained using an injection molding method. Further, a decrease in the molecular weight tends to become more severe in a case where the resin molded article is an injection-molded article obtained at a heating temperature of 220° C. or higher according to an injection molding method. In addition, the cellulose ester resin according to the exemplary embodiment has a low weight average molecular weight of 10,000 to 75,000 and thus, as compared to a case where the molecular weight is higher than the range of 10,000 to 75,000, is largely affected by a decrease in the strength or the like caused by a decrease in the molecular weight during the preparation of a resin molded article.

On the other hand, the resin composition according to the exemplary embodiment includes at least one metal element selected from the group consisting of Group 1 elements and Group 2 elements, and the content of the metal element and the content of sulfur atoms satisfy a relationship (molar ratio) of the expression 1.

Here, it is presumed that sulfur atoms present in the resin composition including a cellulose ester resin mainly originates in sulfuric acid. That is, the content of sulfur atoms is considered as an index indicating the content of sulfuric acid in the resin composition. Accordingly, the expression 1 is considered as an index indicating a ratio (molar ratio) of a Group 1 element whose ionic valence is 1+, a Group 2 element whose ionic valence is 2+, and sulfuric acid in which the valence of sulfate ions ($SO_4^{2-}$) is 2−. It is presumed that ions of a Group 1 element and a Group 2 element present in the resin composition are bonded to at least apart of sulfate ions to form a sulfate. It is presumed that, by the total content of a Group 1 element and a Group 2 element and the content of sulfur atoms satisfying the relationship of the expression 1, the above-described formation of a sulfate is stably performed even during heating for preparing a resin molded article, the breakage of a main chain of a cellulose ester resin caused by sulfate ions is prevented, and therefore, a decrease in the molecular weight may be prevented.

From the viewpoint of preventing hydrolysis which is caused due to the presence of sulfuric acid when cellulose is substituted with an acyl group to perform esterification, that is, from the viewpoint of preventing the substitution degree of cellulose which is substituted with an acyl group or the like to be decreased, the addition of a Group 1 element and a Group 2 element such as Ca or Na may be considered as a stabilizer. However, in addition to or separately from the above-described viewpoint, by considering the viewpoint of preventing the breakage of a main chain of a cellulose ester resin caused by the presence of sulfuric acid when a resin composition is heated to prepare a resin molded article such that a decrease in the strength of the resin molded article caused by a decrease in the molecular weight is prevented, the resin composition according to the exemplary embodiment includes at least one metal element selected from the group consisting of Group 1 elements and Group 2 elements, and the content of the metal element is controlled.

In addition, when a resin composition includes a Group 1 element and a Group 2 element, the resin composition may be colored, that is, haze in color occurs. The reason for this is presumed to be that since the amount of at least one metal element selected from the group consisting of Group 1 elements and Group 2 elements in the resin composition excessively increases, the metal element causes the coloring of the resin composition.

On the other hand, in the resin composition according to the exemplary embodiment, a ratio (weight ratio) of the sum of the content [M1] of the Group 1 element and the content [M2] of the Group 2 element to the total amount of all the elements is in the above-described range. As a result, it is presumed that the contents of the Group 1 element and the Group 2 element are adjusted to an appropriately range, and haze in color of the resin composition and the resin molded article is prevented.

Contents of Group 1 Element and Group 2 Element

The resin composition includes at least one metal element selected from the group consisting of Group 1 elements and Group 2 elements. The contents of the Group 1 element and the Group 2 element in the resin composition satisfy the following relationship.

A molar ratio of the content [M1] of the Group 1 element, the content [M2] of the Group 2 element, and the content [S] of sulfur atoms (S) according to fluorescent X-ray spectroscopy satisfies a relationship of the following expression 1, preferably a relationship of the following expression 2, and more preferably a relationship of the following expression 3.

$$([M1]/2)+[M2] \geq 1.5 \times [S] \quad \text{Expression 1:}$$

$$([M1]/2)+[M2] \geq 2 \times [S] \quad \text{Expression 2:}$$

$$([M1]/2)+[M2] \geq 2.5 \times [S] \quad \text{Expression 3:}$$

When the contents of the Group 1 element and the Group 2 element do not satisfy the expression 1, a decrease in the molecular weight of the cellulose ester resin before and after heating for preparing a resin molded article is not prevented.

In addition, a ratio of the sum of the content [M1] of the Group 1 element and the content [M2] of the Group 2 element to the total amount of all the elements according to fluorescent X-ray spectroscopy is 0.052% by weight or lower, preferably 0.042% by weight or lower, and more preferably 0.032% by weight or lower.

When the contents of the Group 1 element and the Group 2 element do not satisfy the above-described range, haze in color of the resin composition and the resin molded article occurs.

Content of Sulfur Atoms

In the resin composition, a weight ratio of the content of sulfur atoms to the content of the cellulose ester resin according to fluorescent X-ray spectroscopy is preferably 0.005% by weight or higher and more preferably 0.0053% by weight or higher. By controlling the content of the sulfur atoms to be in the above-described range, it is presumed that the resin composition includes a desired amount (for example, 162 ppm or higher) of sulfuric acid, distribution of a substitution degree of the cellulose ester resin is narrowed, and thus a resin composition having satisfactory solubility is obtained.

On the other hand, the upper limit value of the content of sulfur atoms is preferably 0.05% by weight or lower, more preferably 0.01% by weight or lower, and still more preferably 0.008% by weight or lower. By controlling the upper limit value of the content of sulfur atoms to be in the above-described range, the breakage of the main chain of the cellulose ester resin caused by hydrolysis is prevented.

Method of Measuring Content of Each Content

Here, a method of measuring the content of each component included in the resin composition will be described.

Measurement of Contents of Group 1 Element, Group 2 Element, and Sulfur Atoms

A measurement sample is prepared as follows. The size of a sample of the resin composition is determined based on the size of a collimator of a fluorescent X-ray spectrometer and is adjusted to be more than an X-ray irradiation area and less than the size of a sample stage. The thickness of the sample of the resin composition is in a range of 5 mm to 10 mm from a saturated thickness for X-rays. In a case where the schematic shape, thickness, and surface shape of the sample are not uniform, the sample is molded into a disk shape by compression molding after being pulverized using a pulverizer (for example, a vibration mill or a mortar).

As the fluorescent X-ray spectrometer, an energy dispersive fluorescent X-ray spectrometer EDX-720 (manufactured by Shimadzu Corporation) is used. Regarding measurement conditions, rhodium is used as an anode in a tubular bulb, the voltage is set to 50 kv, and a calibration curve method is selected as a quantification method. A reference sample registered for a calibration curve is selected from certified reference materials having a specific gravity similar to that of a base resin in a constituent material being a target.

Regarding the preparation of the calibration curve, a relational expression between a certified value (weight ratio) of the reference material and an X-ray intensity on a target element analysis line or a ratio of an X-ray intensity obtained by calibrating the X-ray intensity on the target element analysis line with a background intensity or a characteristic X-ray intensity is registered as a calibration curve expression.

The ratio of the sum of the content of the Group 1 element and the content of the Group 2 element to the total amount of all the elements may be calculated by measuring the contents thereof in the obtained resin composition according to the above-described method using fluorescent X-ray spectroscopy.

In addition, the above-described ratio may be calculated in consideration of the weight of materials added after performing the measurement according to the method using fluorescent X-ray spectroscopy during the preparation of a resin composition. For example, in a case where a resin composition is prepared using a cellulose ester resin, a compound (metal element-containing compound) for producing ions of a Group 1 element and a Group 2 element, and a plasticizer, the above-described ratio may be calculated in consideration of the weight of the plasticizer added after performing the measurement according to the method using fluorescent X-ray spectroscopy when the metal element-containing compound is added to the cellulose ester resin.

Measurement of Content of Cellulose Ester Resin

The content of the cellulose ester resin in the resin composition is measured using the following method.

The resin composition is dissolved in a solvent, and a main peak in which the weight average molecular weight is 10,000 to 75,000 is separated using a gel permeation chromatograph (GPC) for separation. The proportion of impurities is calculated by NMR measurement, and the content of the cellulose ester resin is calculated based on the separated amount.

Hereinafter, the details of each component of the resin composition according to the exemplary embodiment will be described.

Cellulose Ester

Weight Average Molecular Weight

The specific cellulose ester used in the exemplary embodiment has a weight average molecular weight of 10,000 to 75,000. It is more preferable that the weight average molecular weight is 20,000 to 50,000.

When the weight average molecular weight is higher than 75,000, the elastic modulus decreases, and heat resistance and thermal fluidity deteriorate. On the other hand, when the weight average molecular weight is lower than 10,000, the elastic modulus decreases due to the excessively low molecular weight, and heat resistance deteriorates.

Here, the weight average molecular weight (Mw) is a value measured by gel permeation chromatography (GPC). Specifically, The weight average molecular weight is measured with a GPC apparatus (manufactured by Tosoh corporation, HLC-8320GPC, Column: TSKgel α-M), by using a solution of dimethylacetamide/lithium chloride having a volume ratio of 90/10.

Structure

The specific cellulose ester is a cellulose derivative obtained by esterifying cellulose, for example, with an acyl group or the like, and specific examples thereof include a cellulose derivative represented by formula (1).

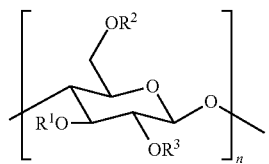

In the formula (1), $R^1$, $R^2$, and $R^3$ each independently represents a hydrogen atom, and an acyl group. n represents an integer of 2 or more. In this case, at least one of n number of $R^1$'s, n number of $R^2$'s, and n number of $R^3$'s represent an acyl group.

It is preferable that the acyl group represented by $R^1$, $R^2$, or $R^3$ is an acyl group having 1 to 6 carbon atoms.

In the formula (1), the range of n is not particularly limited and is preferably 40 to 300 and more preferably 100 to 200.

By adjusting n to 40 or more, the strength of the resin molded article is likely to be improved. By adjusting n to be 300 or less, a decrease in the flexibility of the resin molded article is likely to be prevented.

Acyl Group

In the specific cellulose ester used in the exemplary embodiment, at least hydroxyl group is substituted with an acyl group (more preferably, an acyl group having 1 to 6 carbon atoms). That is, in the case of a cellulose derivative having a structure represented by the formula (1), at least one of n number of $R^1$'s, n number of $R^2$'s, and n number of $R^3$'s represent an acyl group.

That is, a part or all of n number of $R^1$'s present in the cellulose ester resin may be the same as each other, and all of n number of $R^1$'s present in the cellulose ester resin may be different from each other. Likewise, a part or all of n number of $R^2$'s and a part or all of n number of $R^3$'s may be the same as or different from each other, respectively, and all of n number of $R^2$'s and all of n number of $R^3$'s may be different from each other. At least one of n number of $R^2$'s and n number of $R^3$'s represents an acyl group.

When the acyl groups is an acyl group having 1 to 6 carbon atoms, the elastic modulus is increased, and heat resistance is also improved as compared to a case where all of the acyl groups for the substitution in the cellulose ester are acyl groups having 7 or more carbon atoms.

The number of carbon atoms of the acyl groups for the substitution in the specific cellulose ester is preferably 1 to 4 and more preferably 1 to 3.

The acyl group is represented by a structure "—CO—$R_{AC}$", in which $R_{AC}$ represents a hydrogen atom or a hydrocarbon group (more preferably, a hydrocarbon group having 1 to 5 carbon atoms).

The hydrocarbon group represented by $R_{AC}$ may be linear, branched, or cyclic but is preferably linear.

In addition, the hydrocarbon group may be a saturated hydrocarbon group or a unsaturated hydrocarbon group but is preferably a saturated hydrocarbon group.

The hydrocarbon group may have atoms of an element (for example, oxygen or nitrogen) other than carbon and hydrogen but preferably consists of only carbon and hydrogen.

Examples of the acyl group include a formyl group, an acetyl group, a propionyl group, a butyryl group (butanoyl group), a propenoyl group, and a hexanoyl group.

Among these, an acetyl group is preferable as the acyl group from the viewpoint of improving elastic modulus and heat resistance and the viewpoint of improving the moldability of the resin composition.

Substitution Degree

The substitution degree of the specific cellulose ester is preferably 1.8 to 2.5, more preferably 2 to 2.5, and still more preferably 2.2 to 2.5.

By adjusting the substitution degree to be 2.5 or lower, an interaction between substituents is not excessively strong, and a decrease in the mobility of the molecules is prevented. Therefore, a hydrogen bond is likely to be formed between the molecules, the elastic modulus is further improved, and heat resistance is further improved. On the other hand, by adjusting the substitution degree to be 1.8 or higher, an interaction between molecules is not excessively weak, and plasticization is prevented. As a result, the elastic modulus is further improved, and heat resistance is further improved.

The substitution degree is an index indicating the acylation degree of the cellulose ester. Specifically, the substitution degree refers to the intermolecular average number of hydroxyl groups substituted with an acyl group among three hydroxyl groups in one D-glucopyranose of the cellulose ester.

Synthesis Method

The specific cellulose ester used in the exemplary embodiment, that is, the cellulose ester having a weight average molecular weight of 10,000 to 75,000 is not particularly limited and, for example, is synthesized using the following method.

Adjustment of Molecular Weight of Cellulose

First, non-acylated cellulose, that is, cellulose in which a hydroxyl group is not substituted with an acyl group is prepared, and the molecular weight thereof is adjusted.

The non-acylated cellulose may be synthesized or may be commercially available. Typically, cellulose is a plant-derived resin, and the weight average molecular weight thereof is generally higher than that of the specific cellulose ester according to the exemplary embodiment. Therefore, the adjustment of the molecular weight of cellulose is typically a step of reducing the molecular weight.

For example, the weight average molecular weight of a commercially available cellulose is typically 150,000 to 500,000.

Examples of a commercially available non-acylated cellulose include KC FLOCK W50, W100, W200, W300G, W400G, W-100F, W60MG, W-50GK, W-100GK, NDPT, NDPS, LNDP, and NSPP-HR (all of which are manufactured by Nippon Paper Industries Co., Ltd.).

A method of adjusting the molecular weight of the non-acylated cellulose is not particularly limited, and examples thereof include a method of stirring the non-acylated cellulose in liquid to reduce the molecular weight thereof.

By adjusting the stirring rate, stirring time, and the like, the molecular weight of the cellulose may be adjusted to a desired value. Although not particularly limited, the stirring rate is particularly 50 rpm to 3,000 rpm, and more preferably 100 rpm to 1,000 rpm. In addition, the stirring time is preferably 2 hours to 48 hours, and more preferably 5 hours to 24 hours.

Examples of the liquid used during the stirring include an aqueous hydrochloric acid solution, an aqueous formic acid solution, an aqueous acetic acid solution, an aqueous nitric acid solution, and an aqueous sulfuric acid solution.

Preparation of Cellulose Ester

Cellulose whose molecular weight is adjusted using the above-described method or the like is acylated with an acyl group using a well-known method. As a result, the specific cellulose ester is obtained.

For example, in a case where a part of hydroxyl groups included in the cellulose are substituted with an acetyl group, a method of esterifying the cellulose using a mixture of acetic acid, acetic anhydride, and sulfuric acid is used. In addition, in a case where a part of hydroxyl groups included in the cellulose are substituted with a propionyl group, a method of esterifying the cellulose using propionic anhydride instead of the acetic anhydride in the mixture is used. In a case where a part of hydroxyl groups included in the cellulose are substituted with a butanoyl group, a method of esterifying the cellulose using butyric anhydride instead of the acetic anhydride in the mixture is used. In a case where a part of hydroxyl groups included in the cellulose are substituted with a hexanoyl group, a method of esterifying the cellulose using hexanoic anhydride instead of the acetic anhydride in the mixture is used.

In the step of acylating cellulose with an acyl group, the content of sulfur atoms is preferably 0.005% by weight and higher and more preferably 0.0053% by weight or higher. By controlling the content of sulfur atoms to be in the above-described range, it is presumed that the resin composition include a desired amount (for example, 162 ppm or higher) of sulfuric acid, a substitution degree distribution of the obtained cellulose ester resin is narrowed, and thus a resin composition having satisfactory solubility is obtained.

After the acylation, a deacylation step may be further provided in order to adjust the substitution degree. In addition, after the acylation step or the deacylation step, a purification step may be further provided.

Ratio in Resin Composition

A ratio of the amount of the specific cellulose ester to the total amount of the resin composition according to the exemplary embodiment is preferably 70% by weight or higher and more preferably 80% by weight or higher. By controlling the ratio to be 70% by weight or higher, the elastic modulus is further improved, and heat resistance is further improved. Group 1 Element and Group 2 Element The resin composition includes at least one metal element selected from the group consisting of Group 1 elements and Group 2 elements.

Examples of the Group 1 element include Li, Na, K, and Rb. In addition, examples of the Group 2 element include Be, Mg, Ca, and Sr.

The Group 2 element whose ionic valence is 2+ is preferable rather than the Group 1 element whose ionic valence is 1+ from the viewpoint that the amount thereof required to convert sulfate ion into a sulfate may be reduced such that haze in color may be prevented.

Among these, Ca and Mg are preferable from the viewpoint of obtaining a resin molded article in which haze in color is prevented and in which the molecular weight of a cellulose ester resin is prevented from being reduced to lower than the molecular weight of a cellulose ester resin in a resin composition.

Further, sulfuric acid in the form of a sulfate has higher solubility and thus may be more efficiently removed. Therefore, Ca is more preferable from the viewpoint of obtaining a resin molded article in which the molecular weight of a cellulose ester resin is prevented from being reduced to lower than the molecular weight of the cellulose ester resin in a resin composition.

A source of supplying the Group 1 element and the Group 2 element to the resin composition is not particularly limited as long as it is a compound (metal element-containing compound) for producing ions of a Group 1 element and a Group 2 element. Examples of the metal element-containing compound include an acetate (for example, $(CH_3COO)_2Ca$ or CH$_3$COONa) and a hydroxide (for example, CaOH$_2$ or NaOH). Among these, an acetate is preferable.

The time at which the metal element-containing compound is added to the resin composition is not particularly limited as long as it is before heating for preparing a resin molded article. For example, the metal element-containing compound may be added to the resin composition before or during the step of esterifying (acylating) cellulose, or may be added to the resin composition after the esterification (acylation) of cellulose and before the preparation of a resin molded article.

From the viewpoint of preventing a decrease in the molecular weight, it is more preferable that the metal element-containing compound is added to the resin composition after the esterification (acylation) of cellulose and before the preparation of a resin molded article.

Plasticizer

The resin composition according to the exemplary embodiment may further include a plasticizer.

However, it is preferable that the content of the plasticizer is in such a range that the ratio of the specific cellulose ester to the total amount of the resin composition is in the above-described range. More specifically, the ratio of the plasticizer to the total amount of the resin composition is preferably 15% by weight or lower, more preferably 10% by weight or lower, and still more preferably 5% by weight or lower. By controlling the ratio of the plasticizer to be in the above-described range, the elastic modulus is further improved, and heat resistance is further improved. In addition, bleeding of the plasticizer is also prevented.

Examples of the plasticizer include an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, a citric acid ester, a stearic acid ester, a metallic soap, polyol, and polyalkylene oxide.

Among these, an adipic acid ester-containing compound or a polyether ester compound is preferable, and an adipic acid ester-containing compound is more preferable.

Adipic Acid Ester-Containing Compound

The adipic acid ester-containing compound (compound containing an adipic acid ester) refers to an adipic acid ester alone, or a mixture of an adipic acid ester and a component other than an adipic acid ester (a compound different from an adipic acid ester). However, the adipic acid ester-containing compound contains preferably 50% by weight or higher of the adipic acid ester with respect to all the components.

As the adipic acid ester, for example, adipic acid diester, and adipic acid polyester are exemplified. Specifically, adipic acid diester represented by the formula (2-1) and adipic acid polyester represented by the formula (2-2) are exemplified.

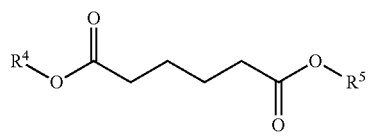
(2-1)

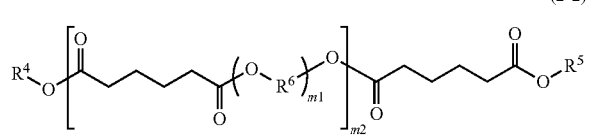
(2-2)

In the formulae (2-1) and (2-2), R$^4$ and R$^5$ each independently represents an alkyl group, or a polyoxyalkyl group [—(C$_x$H$_{2x}$—O)$_y$—R$^{41}$] (provided that R$^{41}$ represents an alkyl group, x represents an integer in the range of 1 to 10, and y represents an integer in the range of 1 to 10).

R$^6$ represents an alkylene group.

m1 represents an integer in the range of 1 to 20.

m2 represents an integer in the range of 1 to 10.

In the formulae (2-1) and (2-2), the alkyl groups represented by R$^4$ and R$^5$ are preferably alkyl groups having 1 to 6 carbon atoms, and more preferably alkyl groups having 1 to 4 carbon atoms. The alkyl groups represented by R$^4$ and R$^5$ may have any one of a linear shape, a branched shape, or a cyclic shape, but preferably a linear shape and a branched shape.

In the formulae (2-1) and (2-2), in the polyoxyalkyl group represented by R$^4$ and R$^8$ [—(C$_x$H$_{2x}$—O)$_y$—R$^{41}$], the alkyl group represented by R$^{41}$ is preferably an alkyl group having 1 to 6 carbon atoms, and more preferably an alkyl group having 1 to 4 carbon atoms. The alkyl group represented by R$^{41}$ may have any one of a linear shape, a branched shape, or a cyclic shape, but preferably a linear shape and a branched shape.

In the formula (2-2), the alkylene group represented by R$^6$ is preferably an alkylene group having 1 to 6 carbon atoms, and more preferably an alkylene group having 1 to 4 carbon atoms. The alkylene group represented by R$^6$ may have any one of a linear shape, a branched shape, or a cyclic shape, but preferably a linear shape and a branched shape.

In the formulae (2-1) and (2-2), the group represented by each of symbols R$^4$ to R$^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but are not limited thereto.

| Name of Material | Name of Product | Manufacturer |
|---|---|---|
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, or example, a polyether ester compound represented by the formula (2) is exemplified.

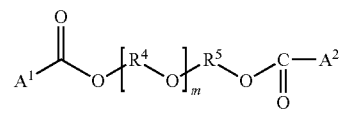
(2)

In the formula (2), R$^4$ and R$^5$ each independently represents an alkylene group having 2 to 10 carbon atoms. A$^1$ and $A^2$ each independently represents an alkyl group having 1 to 6 carbon atoms, an aryl group having 6 to 12 carbon atoms, or an aralkyl group having 7 to 18 carbon atoms. m represents an integer of 1 or greater.

In the formula (2), as the alkylene group represented by $R^4$, an alkylene group having 3 to 10 carbon atoms is preferable, and an alkylene group having 3 to 6 carbon atoms is more preferable. The alkylene group represented by $R^4$ may have any one of a linear shape, a branched shape, or a cyclic shape, but preferably a linear shape.

If the number of carbons of the alkylene group represented by $R^4$ is set to be 3 or greater, the decrease of the fluidity of the resin composition is prevented, and thermoplasticity is easily exhibited. If the number of carbons of the alkylene group represented by $R^4$ is 10 or lower, or the alkylene group represented by $R^4$ has a linear shape, the affinity to the cellulose derivative is easily enhanced. Therefore, if the alkylene group represented by $R^4$ has a linear shape, and the number of carbons is in the range described above, moldability of the resin composition is enhanced.

In this point of view, particularly, the alkylene group represented by $R^4$ is preferably a n-hexylene group ($—(CH_2)_6—$). That is, the polyether ester compound is preferably a compound where $R^4$ represents a n-hexylene group ($—(CH_2)_6—$).

In the formula (2), as the alkylene group represented by $R^5$, an alkylene group having 3 to 10 carbon atoms is preferable, and an alkylene group having 3 to 6 carbon atoms is more preferable. The alkylene group represented by $R^5$ may have any one of a linear shape, a branched shape, or a cyclic shape, but preferably a linear shape.

If the number of carbons of the alkylene group represented by $R^5$ is 3 or greater, the decrease of the fluidity of the resin composition is prevented, and the thermoplasticity is easily exhibited. If the number of carbons of the alkylene group represented by $R^5$ is 10 or lower, or if the alkylene group represented by $R^5$ has a linear shape, the affinity to the cellulose derivative is easily enhanced. Therefore, if the alkylene group represented by $R^5$ has a linear shape, and the number of carbons is in the range described above, moldability of the resin composition is enhanced.

In this point of view, particularly, the alkylene group represented by $R^5$ is preferably a n-butylene group ($—(CH_2)_4—$). That is, the polyether ester compound is preferably a compound where $R^5$ represents a n-butylene group ($—(CH_2)_4—$).

In the formula (2), the alkyl groups represented by $A^1$ and $A^2$ are alkyl groups having 1 to 6 carbon atoms, and alkyl groups having 2 to 4 carbon atoms are more preferable. The alkyl groups represented by $A^1$ and $A^2$ may have anyone of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by $—R^A$-Ph. $R^A$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzil group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

$$\text{SP value}=\sqrt{(Ev/v)}=\sqrt{(\Sigma\Delta ei/\Sigma\Delta vi)} \qquad \text{Equation:}$$

(In the equation, Ev: evaporation energy (cal/mol), v: molar volume (cm$^3$/mol), Δei: evaporation energy of each atom or atom group, and Δvi: molar volume of each atom or atom group)

In addition, the solubility parameter (SP value) employs (cal/cm$^3$)$^{1/2}$ as a unit, but the unit is omitted in conformity with practice, and is described in a dimensionless manner.

Hereinafter, specific examples of the polyether ester compound are described, but the invention is not limited thereto.

|  | R⁴ | R⁵ | A¹ | A² | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight to 5% by weight with respect to the total amount of the resin composition. Here, the expression "0% by weight" means not including other components.

The resin composition according to the exemplary embodiment may contain other resins in addition to the resin described above. However, it is preferable that the other resins are included in amounts with which the ratio of the specific cellulose ester occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinylexpression polymer or a vinylexpression copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

Method of Preparing Resin Composition

The resin composition according to the exemplary embodiment is prepared, for example, by molten-kneading a mixture including at least the above-described specific cellulose ester, sulfuric acid, and a compound (metal element-containing compound) for producing ions of a Group 1 element and a Group 2 element. In addition, the resin composition according to the exemplary embodiment is prepared, for example, by dissolving the above-described components in a solvent.

Here, a well-known unit is used as a molten-kneading unit, and specific examples thereof include a twin-screw extruder, a HENSCHEL mixer, a BANBURY mixer, a single-screw extruder, a multi-screw extruder, and a co-kneader.

The kneading temperature may be determined according to the melting temperature of the cellulose ester to be used and, for example, is preferably 140° C. to 240° C. and more preferably 160° C. to 200° C. from the viewpoints of thermal decomposition and fluidity.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 200° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

EXAMPLES

Hereinafter, the invention is described in greater detail with reference to examples, but the invention is not limited to the examples. In addition, unless described otherwise, the expression "part" refers to "part by weight".

Preparation of Cellulose 2 kg of cellulose (KC Flock W50 manufactured by Nippon Paper Industries Co., Ltd.) is put to 20 L of an aqueous solution of 0.1 M hydrochloric acid, and stirred at room temperature (25° C.). In stirring time shown in Table 1, cellulose in respective molecular weights is obtained. In addition, EP-1800 (product name, manufactured by Shinto Scientific Co., Ltd.) is used as a stirring apparatus, and the rotation speed at the time of stirring is set to 500 rpm.

The weight average molecular weight is measured with a GPC apparatus (manufactured by Tosoh corporation, HLC-8320GPC, Column: TSKgel α-M), by using a solution of dimethylacetamide/lithium chloride having a volume ratio of 90/10.

Cellulose (1): weight average molecular weight Mw=48,500

Cellulose (2): weight average molecular weight Mw=51,800

Cellulose (3): weight average molecular weight Mw=185,000

Preparation of Cellulose Ester

Acetylation Step 1 kg of each of the celluloses (1), (2), and (3) and 500 g of glacial acetic acid are sprayed to be pre-treated and activated. Next, a mixture of 3.8 kg of glacial acetic acid, 2.4 kg of acetic anhydride, and 81 g of sulfuric acid is added, and the components are stirred and mixed with each other at a temperature of 40° C. or lower to esterify cellulose. At the time when no fiber fragments are observed, the end of esterification is determined.

Deacetylation Step 2 kg of acetic acid and 1 kg of water are added thereto, and the resultant is stirred at room temperature (25° C.) for 2 hours.

Purification Step

Further, this solution is slowly added dropwise to a solution in which 20 kg of sodium hydroxide is dissolved in kg of water while being stirred. The obtained white precipitate is filtered under reduced pressure and is washed with 60 kg of water. As a result, cellulose esters (DAC (1), (2), and (3)) are obtained.

Cellulose ester (DAC (4)) is obtained under the same conditions as described above, except that the amount of sulfuric acid in the acetylation step of the cellulose (1) is changed to 18 g.

The molecular weight is measured using the same method as that of the cellulose (1), and the substitution degree is obtained by $H^1$-NMR measurement (JNM-ECZR, manufactured by JEOL Ltd.).

DAC (1): Mw=40,040, substituent=acetyl, substitution degree=2.26

DAC (2): Mw=55,686, substituent=acetyl, substitution degree=2.23

DAC (3): Mw=130, 416, substituent=acetyl, substitution degree=2.38

DAC (4): Mw=36,477, substituent=acetyl, substitution degree=2.36

Preparation of Pellet

Calcium acetate (($CH_3COO)_2Ca$) is added such that the content of Ca is shown in Table 1 below with respect to 100 parts of the DAC (1). At this time (that is, before the addition of a plasticizer and after the addition of calcium acetate), a ratio of the content of Ca to the total amount of all the elements and a ratio of the content of S to the total amount of all the elements are measured according to the above-described method using fluorescent X-ray spectroscopy. In addition, a weight ratio and a molar ratio (Ca/S) are calculated.

Next, 12.5 parts of a plasticizer (adipic acid ester mixture, DAIFATTY 101, manufactured by Daihachi Chemical Industry Co., Ltd.) is added, and the components are kneaded with each other at a kneading temperature of 230° C. using a twin-screw extruder (TEX41SS, manufactured by Toshiba Machine Co., Ltd.) to obtain a resin composition pellet. A ratio of the content of Ca to the total amount of all the elements after the addition of the plasticizer (that is, a ratio of the sum of the content of the Group 1 element and the content of the Group 2 element to the total amount of all the elements) is calculated in consideration of the addition amount (12.5 parts) of the plasticizer.

A resin composition pellet is obtained under the same conditions as described above, except that calcium acetate (($CH_3COO)_2Ca$) is added such that the content of Ca is as shown in Table 1 below.

In addition, resin composition pellets each are obtained under the same conditions as described above, except that: the DAC (2), the DAC (3), or the DAC (4) is used instead of the DAC (1); and calcium acetate (($CH_3COO)_2Ca$) is added such that the content of Ca is as shown in Table 1 below.

In addition, resin composition pellets each are obtained under the same conditions as described above, except that: the DAC (2) is used instead of the DAC (1); magnesium acetate or sodium acetate is used instead of calcium acetate (($CH_3COO)_2Ca$); and magnesium acetate or sodium acetate is added such that the content of Mg or the content of Na is as shown in Table 2 or 3 below.

The content of Mg, the content of Na, and the content of S are measured by fluorescent X-ray spectroscopy before the addition of the plasticizer as described above.

In addition, a ratio of the content of Mg or the content of Na to the total amount of all the elements after the addition of the plasticizer (that is, a ratio of the sum of the content of the Group 1 element and the content of the Group 2 element to the total amount of all the elements) is calculated in consideration of the addition amount (12.5 parts) of the plasticizer. During the calculation, the atomic weight of Ca is 40, the molecular weight of calcium acetate is 158, the atomic weight of Mg is 24, the molecular weight of magnesium acetate is 142, the atomic weight of Na is 23, and the molecular weight of sodium acetate is 82.

In addition, regarding each of the pellets, "weight average molecular weight" is measured using the above-described method, and a ratio of the weight average molecular weight to the molecular weight before heating (that is, before kneading using the twin-screw extruder) is calculated. The results are shown in the table below as "Molecular Weight after Heating".

Further, "coloring" of each of the obtained pellets is evaluated by visual inspection.

TABLE 1

| | (Before Addition of Plasticizer) Fluorescent X-Ray Spectroscopy | | | | (After Addition of Plasticizer) | | | |
|---|---|---|---|---|---|---|---|---|
| | Content of S | Content of Ca | Ca/S (Weight Ratio) | Ca/S (Molar Ratio) | Content of Ca [Calculated Value] | Molecular Weight After Heating | Coloring | Note |
| DAC(1) Mw 40040 | 0.0086% | 0.0644% | 7.49 | 5.99 | 0.0573% | 100% | Light Brown | Comparative Example 1 |
| | | 0.0531% | 6.17 | 4.94 | 0.0472% | 99% | Light Yellow | Example 1 |
| | | 0.0211% | 2.45 | 1.96 | 0.0188% | 98% | White | Example 2 |
| | | 0.0126% | 1.47 | 1.17 | 0.0112% | 93% | White | Comparative Example 2 |
| | | 0% | 0 | 0 | 0% | 11% | Brown | Comparative Example 3 |
| DAC(2) Mw 55686 | 0.0069% | 0.0308% | 4.46 | 3.57 | 0.0274% | 100% | White | Example 3 |
| | | 0.0231% | 3.35 | 2.68 | 0.0205% | 100% | White | Example 4 |
| | | 0.0147% | 2.13 | 1.70 | 0.0131% | 100% | White | Example 5 |
| | | 0.0099% | 1.43 | 1.15 | 0.0088% | 91% | White | Comparative Example 4 |
| DAC(4) Mw 36477 | 0.0039% | 0.0199% | 5.10 | 4.08 | 0.0177% | 99% | White | Example 6 |
| | | 0.0099% | 2.54 | 2.03 | 0.0088% | 100% | White | Example 7 |
| | | 0.0071% | 1.82 | 1.46 | 0.0063% | 94% | White | Comparative Example 5 |
| | | 0% | 0 | 0 | 0% | 19% | Brown | Comparative Example 6 |
| DAC(3) Mw 130416 | 0.0061% | 0.0391% | 6.41 | 5.13 | 0.0348% | 100% | White | Comparative Example 7 |
| | | 0.0307% | 5.03 | 4.03 | 0.0273% | 100% | White | Comparative Example 8 |
| | | 0.0170% | 2.79 | 2.23 | 0.0151% | 96% | White | Comparative Example 9 |
| | | 0% | 0 | 0 | 0% | 10% | Brown | Comparative Example 10 |

TABLE 2

| | (Before Addition of Plasticizer) Fluorescent X-Ray Spectroscopy | | | | (After Addition of Plasticizer) | | | |
|---|---|---|---|---|---|---|---|---|
| | Content of S | Content of Mg | Mg/S (Weight Ratio) | Mg/S (Molar Ratio) | Content of Mg [Calculated Value] | Molecular Weight After Heating | Coloring | Note |
| DAC(2) Mw 55686 | 0.0069% | 0.0413% | 5.99 | 7.90 | 0.0367% | 100% | White | Example 8 |
| | | 0.0306% | 4.43 | 5.85 | 0.0272% | 100% | White | Example 9 |
| | | 0.0114% | 1.65 | 2.18 | 0.0101% | 99% | White | Example 10 |

TABLE 3

| | (Before Addition of Plasticizer) Fluorescent X-Ray Spectroscopy | | | | (After Addition of Plasticizer) | | | |
|---|---|---|---|---|---|---|---|---|
| | Content of S | Content of Na | Na/S (Weight Ratio) | (Na/2)/S (Molar Ratio) | Content of Na [Calculated Value] | Molecular Weight After Heating | Coloring | Note |
| DAC(2) Mw 55686 | 0.0069% | 0.0664% | 9.62 | 6.71 | 0.0590% | 100% | Brown | Comparative Example 11 |
| | | 0.0186% | 2.70 | 1.88 | 0.0165% | 98% | White | Example 11 |
| | | 0.0151% | 2.19 | 1.53 | 0.0134% | 95% | White | Example 12 |

As shown in the above-described tables, it is found that, in Examples in which the contents of the Group 1 element and the Group 2 element satisfy the relationship of the expression 1, a decrease in the molecular weight is prevented as compared to Comparative Examples in which the contents of the Group 1 element and the Group 2 element do not satisfy the expression 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a cellulose ester resin having a weight average molecular weight of 10,000 to 75,000;
sulfuric acid; and
at least one metal element selected from the group consisting of Group 1 elements and Group 2 elements,
wherein
a ratio of a sum of a content [M1] of all the Group 1 elements and a content [M2] of all the Group 2 elements to a total amount of all the elements according to fluorescent X-ray spectroscopy is 0.052% by weight or less, and
a molar ratio of the content [M1] of all the Group 1 elements, the content [M2] of all the Group 2 elements, and a content [S] of sulfur atoms (S) according to fluorescent X-ray spectroscopy satisfies a relationship of ([M1]/2)+[M2]≥2.0×[S].  Expression 2:

2. The resin composition according to claim 1,
wherein the at least one metal element includes at least one of Ca and Mg.
3. The resin composition according to claim 1,
wherein the at least one metal element includes Ca.
4. The resin composition according to claim 1,
wherein the cellulose ester resin includes a cellulose derivative in which at least one hydroxyl group in cellulose is substituted with an acyl group having 1 to 6 carbon atoms.
5. The resin composition according to claim 1,
wherein the cellulose ester resin includes cellulose acetate.
6. The resin composition according to claim 4,
wherein a substitution degree of the acyl group in the cellulose derivative is 1.8 to 2.5.
7. A resin molded article comprising
the resin composition according to claim 1.
8. The resin molded article according to claim 7,
wherein the resin molded article is an injection-molded article.
9. A method of preparing a resin composition, comprising:
preparing a cellulose ester resin having a weight average molecular weight of 10,000 to 75,000 by esterifying cellulose with an acyl group in the presence of sulfuric acid;
adding a metal element-containing compound, which produces an ion of at least one metal element selected from the group consisting of Group 1 elements and Group 2 elements, at least either of before, after, or during the preparation of a cellulose ester resin; and
molten-kneading a mixture including at least the cellulose ester resin, the sulfuric acid, and the metal element-containing compound to prepare a resin composition in which a ratio of a sum of a content [M1] of all the Group 1 elements and a content [M2] of all the Group 2 elements to a total amount of all the elements according to fluorescent X-ray spectroscopy is 0.052% by weight or less, and in which a molar ratio of the content [M1] of all the Group 1 elements, the content [M2] of all the Group 2 elements, and the content [S] of sulfur atoms (S) according to fluorescent X-ray spectroscopy satisfies a relationship of ([M1]/2)+[M2]≥2.0×[S].  Expression 2:

10. The method of preparing a resin composition according to claim 9,
wherein a concentration of sulfuric acid during the preparation of the cellulose ester resin is 162 ppm or higher.
11. The method of preparing a resin composition according to claim 9,
wherein at least one of Ca or Mg is included as the at least one metal element.
12. The method of preparing a resin composition according to claim 9,
wherein the at least one metal element includes Ca.
13. The method of preparing a resin composition according to claim 9,
wherein the cellulose ester resin includes a cellulose derivative in which at least one hydroxyl group in cellulose is substituted with an acyl group having 1 to 6 carbon atoms.
14. The method of preparing a resin composition according to claim 9,
wherein the cellulose ester resin includes cellulose acetate.
15. The method of preparing a resin composition according to claim 9,
wherein a substitution degree of the acyl group in the cellulose derivative is 1.8 to 2.5.
16. The resin composition according to claim 1,
wherein the cellulose ester resin has a weight average molecular weight of 20,000 to 50,000.
17. The method of preparing a resin composition according to claim 9,
wherein the cellulose ester resin has a weight average molecular weight of 20,000 to 50,000.

* * * * *